United States Patent
Eto et al.

(10) Patent No.: US 9,849,049 B2
(45) Date of Patent: Dec. 26, 2017

(54) DRIVING APPARATUS AND DRIVING METHOD

(71) Applicant: KABUSHIKI KAISHA TOSHIBA, Tokyo (JP)

(72) Inventors: Haruna Eto, Kanagawa (JP); Hideichi Nakamoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 335 days.

(21) Appl. No.: 14/657,269

(22) Filed: Mar. 13, 2015

(65) Prior Publication Data
US 2015/0257951 A1 Sep. 17, 2015

(30) Foreign Application Priority Data

Mar. 14, 2014 (JP) .................. 2014-052621

(51) Int. Cl.
*A61G 5/14* (2006.01)
*G01G 19/44* (2006.01)

(52) U.S. Cl.
CPC .............. *A61G 5/14* (2013.01); *G01G 19/44* (2013.01)

(58) Field of Classification Search
CPC .................................. A61G 5/14; G01G 19/44
USPC ............................... 318/3, 34, 558
See application file for complete search history.

(56) References Cited

U.S. PATENT DOCUMENTS

| 5,282,460 A * | 2/1994 | Boldt | A61F 2/68 403/119 |
| 8,012,107 B2 * | 9/2011 | Einav | A63B 21/4021 601/5 |
| 8,274,244 B2 * | 9/2012 | Horst | A61F 2/68 310/83 |

FOREIGN PATENT DOCUMENTS

| JP | 7-31023 | 1/1995 |
| JP | 2011-19746 | 2/2011 |
| JP | 2011-167297 | 9/2011 |

* cited by examiner

*Primary Examiner* — David S Luo
(74) *Attorney, Agent, or Firm* — Finnegan, Henderson, Farabow, Garrett & Dunner, L.L.P.

(57) ABSTRACT

A driving apparatus according to an embodiment includes a support unit configured to support a portion of an upper limb of a user, a driving unit configured to move the support unit along a track having at least a component in a direction perpendicular to a floor surface, a first measurement unit configured to obtain a first measurement value by measuring a force applied to the support unit, and a control unit configured to drive the driving unit when the first measurement value is more than a predetermined threshold value, so that the driving apparatus can assist a person's standing up action.

6 Claims, 16 Drawing Sheets

DRIVING APPARATUS AND DRIVING METHOD

CROSS-REFERENCE TO RELATED APPLICATIONS

This application is based upon and claims the benefit of priority from the Japanese Patent Application No. 2014-052621, filed on Mar. 14, 2014; the entire contents of which are incorporated herein by reference.

FIELD

An embodiment of the present invention generally relates to a driving apparatus and a driving method.

BACKGROUND

A person who has difficulty in standing up by himself/herself because of muscle weakness and diseases needs certain assistance. For example, a driving apparatus has been suggested to assist a standing up action of a person by inclining a seat surface forward or raising the seat surface when the person stands up from a seated state on the seat surface such as a toilet seat. However, with the driving apparatus, the inclination of the seat surface during assistance is changed every moment, and this greatly changes the load applied to the legs of the person in accordance with the standing up action. The change in the load applied to the legs during assistance (especially, a load applied in a direction in which the knees are bent) is not preferable in order for a person to perform a stable standing up action.

Therefore, a problem to be solved by the present invention is to provide a driving apparatus and a driving method capable of assisting a person's standing up action in a stable manner.

DETAILED DESCRIPTION

A driving apparatus according to an embodiment includes a support unit configured to support a portion of an upper limb of a user, a driving unit configured to move and drive the support unit along a track having at least a component in a direction perpendicular to a floor surface, a first measurement unit configured to obtain a first measurement value by measuring a force applied to the support unit, and a control unit configured to drive the driving unit when the first measurement value is more than a predetermined threshold value.

A driving method according to an embodiment is a driving method for a driving apparatus having a support unit supporting a portion of an upper limb of a user, and a first measurement value is obtained by measuring a force applied to the support unit, and when the first measurement value is more than a threshold value, the support unit is moved along a track having at least a component in a direction perpendicular to a floor surface.

Embodiments for carrying out the invention will be hereinafter explained with reference to drawings.

In the embodiments below, as an example, a scene in which a standing up action performed by a person who has difficulty in performing the standing up action from a toilet seat of a toilet by himself/herself (hereinafter referred to as a user) is assisted will be explained.

(First Embodiment)

Figure 1:
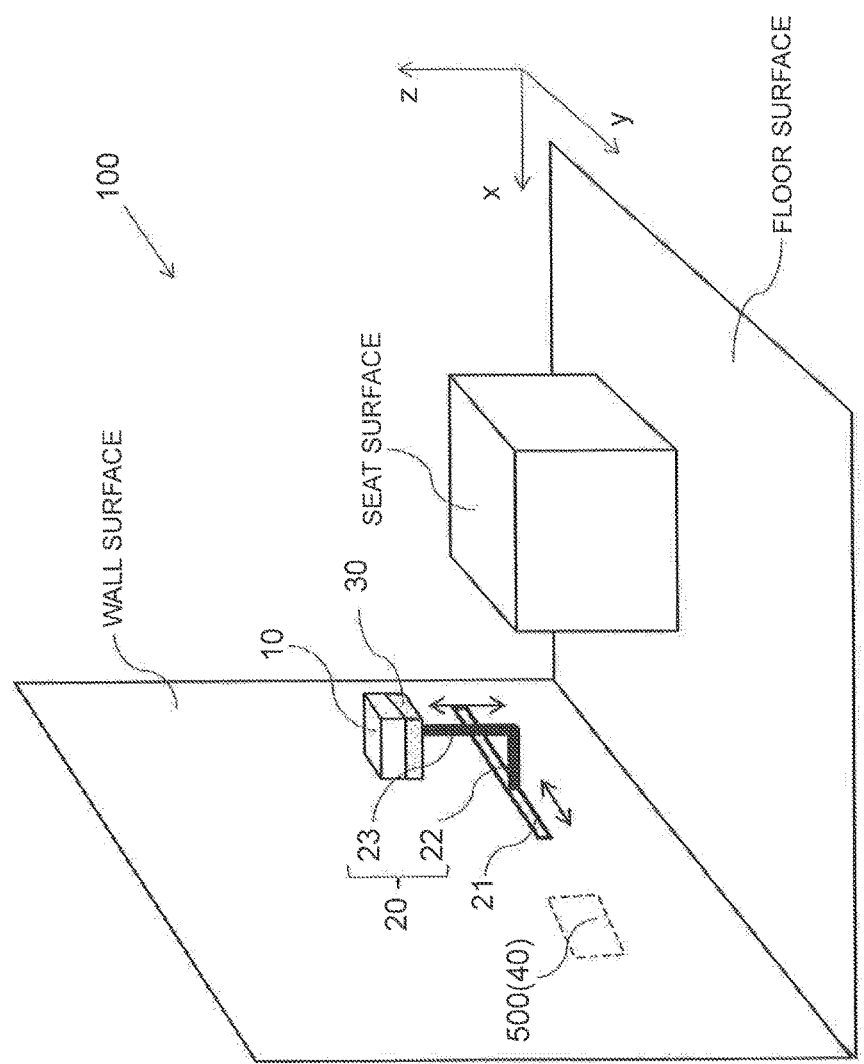
FIG. 1 is a figure schematically illustrating a driving apparatus according to a first embodiment.

FIG. 1 is a figure schematically illustrating a driving apparatus 100 according to the first embodiment. In FIG. 1, the driving apparatus 100 is disposed in a space of a toilet separated by a wall and a floor provided with a toilet seat.

In this case, in the motion of the waist or the knee of a person during standing up action, the movable range in the adduction/abduction direction is known to be smaller than the movable range in the bending/extending direction. More specifically, the driving apparatus supporting the force applied in the bending and stretching/extending direction has difficulty in providing stable assistance because the load of the knee or the waist changes depending on how much the user achieves the force by himself/herself.

The driving apparatus 100 as shown in FIG. 1 supports a part close to the center of gravity of the user (a portion of an upper limb) of which posture is inclined with respect to the side surface, and raises the supported part of z axis direction, thus supporting user's standing up action. As described above, the part close to the center of gravity of the user is adopted as the fulcrum, and while the load applied in the adduction/abduction direction is supported, the standing up action is assisted from the state in which the user's posture is inclined, so that the change in the load applied in the bending/extending direction of the knees of the user is reduced.

The driving apparatus 100 includes a support unit 10 supporting a portion of an upper limb at a side surface of the user, a driving unit 20 configured to move the support unit 10 to an upper side, a force measurement unit (first measurement unit) 30 configured to measure the force applied to the support unit 10, and a control unit 40 configured to control driving of the driving unit 20. The control unit 40 is embedded in the wall as a unit 500 including an arithmetic processing unit and a memory, and for example, the control unit 40 makes a serial connection with the driving unit 20 and the force measurement unit 30 via a serial communication cable (not shown).

Figure 2:
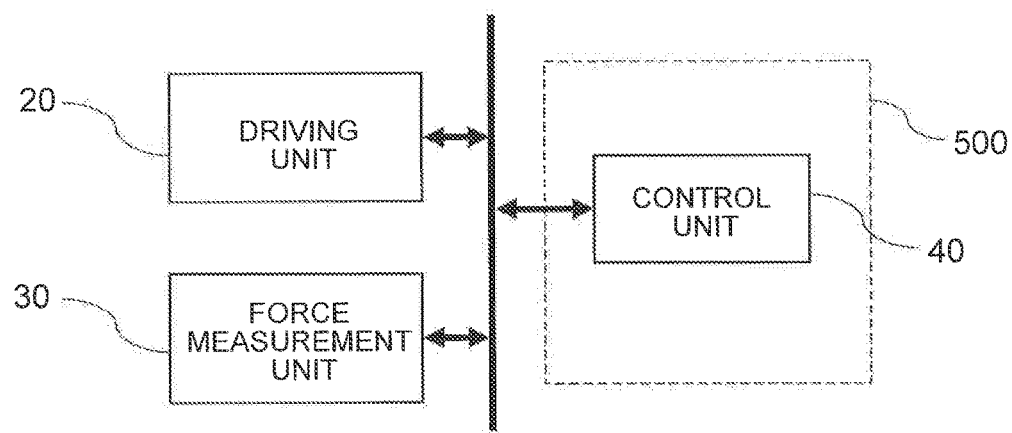
FIG. 2 is a block diagram illustrating the driving apparatus according to the first embodiment.

FIG. 2 is a block diagram illustrating the driving apparatus 100 according to the first embodiment. In FIG. 2, each configuration as shown in FIG. 1 is connected with each other via a bus.

The support unit 10 is a stage provided at a position capable of supporting a portion of an upper limb (for example, an elbow) while the user sits on the toilet seat and the posture of the user is inclined with respect to the wall surface. The support unit 10 is provided on, for example, the wall surface (y-z plane). In this case, for example, a user's elbow is explained as the "upper limb", but the upper limb includes a part from the user's shoulder to the user's fingertip.

The driving unit 20 is a mechanism for moving the support unit 10 to the upper side (at least, a positive direction in the z axis). The driving unit 20 moves the support unit 10 of y axis and z axis direction along a track including at least a component in a direction perpendicular to the floor surface (z axis direction), e.g., along the track in the wall surface (y-z plane).

The driving unit 20 includes a first member 22 moving on a rail 21 provided along x axis direction in the portion of the wall surface, and a second member 23 fixed to the first member 22 and configured to extend and shrink of z axis direction. The support unit 10 is fixed to the distal end of the second member 23, and each of the first member 22 and the second member 23 is driven by a motion force source (not shown) such as a motor, so that they move along the wall surface (y-z plane).

The force measurement unit 30 is a sensor for measuring the force applied to the support unit 10. In this case, the force means a counterforce applied to the elbow from the support unit 10, for example. The force measurement unit 30 is a sensor for measuring the force corresponding to this counterforce, and, for example, a weight scale can be used. The force measurement unit 30 measures the force applied to the support unit 10, and transmits a measured result (first measurement value) to the control unit 40 via the serial communication cable.

The control unit 40 determines whether the user's elbow is placed on the support unit 10 or not (condition 1), and whether the posture of the user is sufficiently inclined with respect to the side surface or not (condition 2), and in a case where both of the conditions are satisfied, control is performed to drive the driving unit 20 to the upper side (at least the positive direction of z axis) with the motion force source (not shown) such as a motor.

The control unit 40 determines that both of (condition 1) and (condition 2) are satisfied in a case where the measurement value received from the force measurement unit 30 is more than a certain threshold value A. In this case, the threshold value A can be set on the basis of the measurement result at this occasion by previously researching the force applied to the support unit 10 in the state where, for example, the posture of the user is sufficiently inclined with respect to the side surface. For example, about 20 percent (12 kg) of an average weight (60 kg) of ordinary people is preferably as the threshold value A. It should be noted that the threshold value A can be stored in a memory in advance.

When the measurement value received from the force measurement unit 30 is more than the certain threshold value A, the control unit 40 performs control to drive the driving unit 20 to the upper side along the track in y-z plane having at least a component in the vertical direction (z axis direction). This track is, for example, a track derived from numerical analysis so that the load applied to the legs of the user becomes the least, and can be stored in the memory in advance.

Figure 3B:
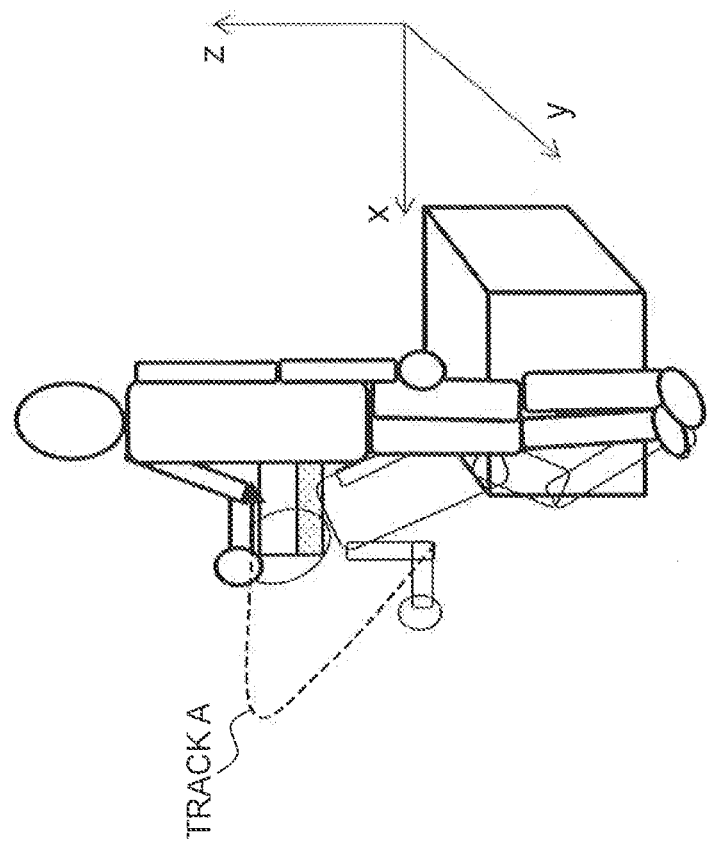
FIGS. 3(A) and 3(B) are figures illustrating an example of assistance provided by the driving apparatus according to the first embodiment.
Figure 3A:
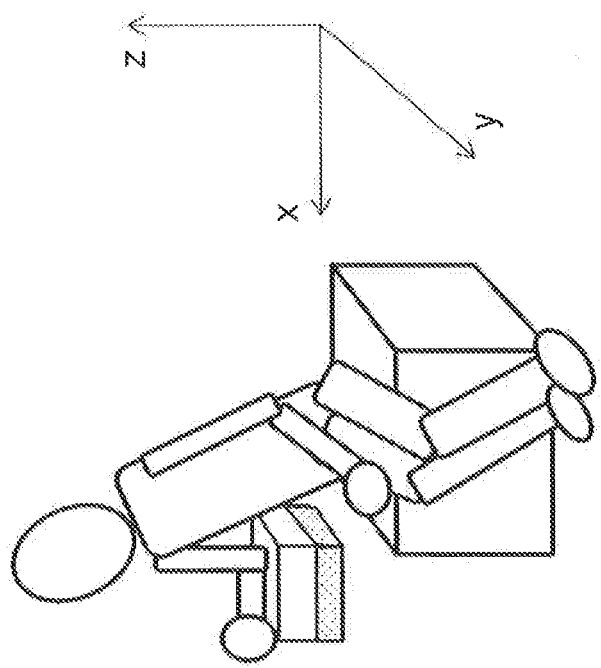

FIGS. 3(A) and 3(B) illustrate a flow when the driving apparatus 100 is used to assist the standing, up action. FIG. 3(A) illustrates the state at the start of assistance. FIG. 3(B) illustrates the state when the assistance is finished. In the example as shown in FIGS. 3(A) and 3(B), at the start of assistance, the driving unit 20 moves forward (the positive direction of y axis) and upward direction in the vertical direction (the positive direction of z axis), and in the middle phase of the assistance in which the person is almost in the standing state, the driving unit 20 is driven along the track A toward the back side (the negative direction of y axis). Therefore, when the person is almost in the standing state, the person can be returned back to the upright posture, and therefore, the standing up action can be assisted more naturally.

Figure 4:
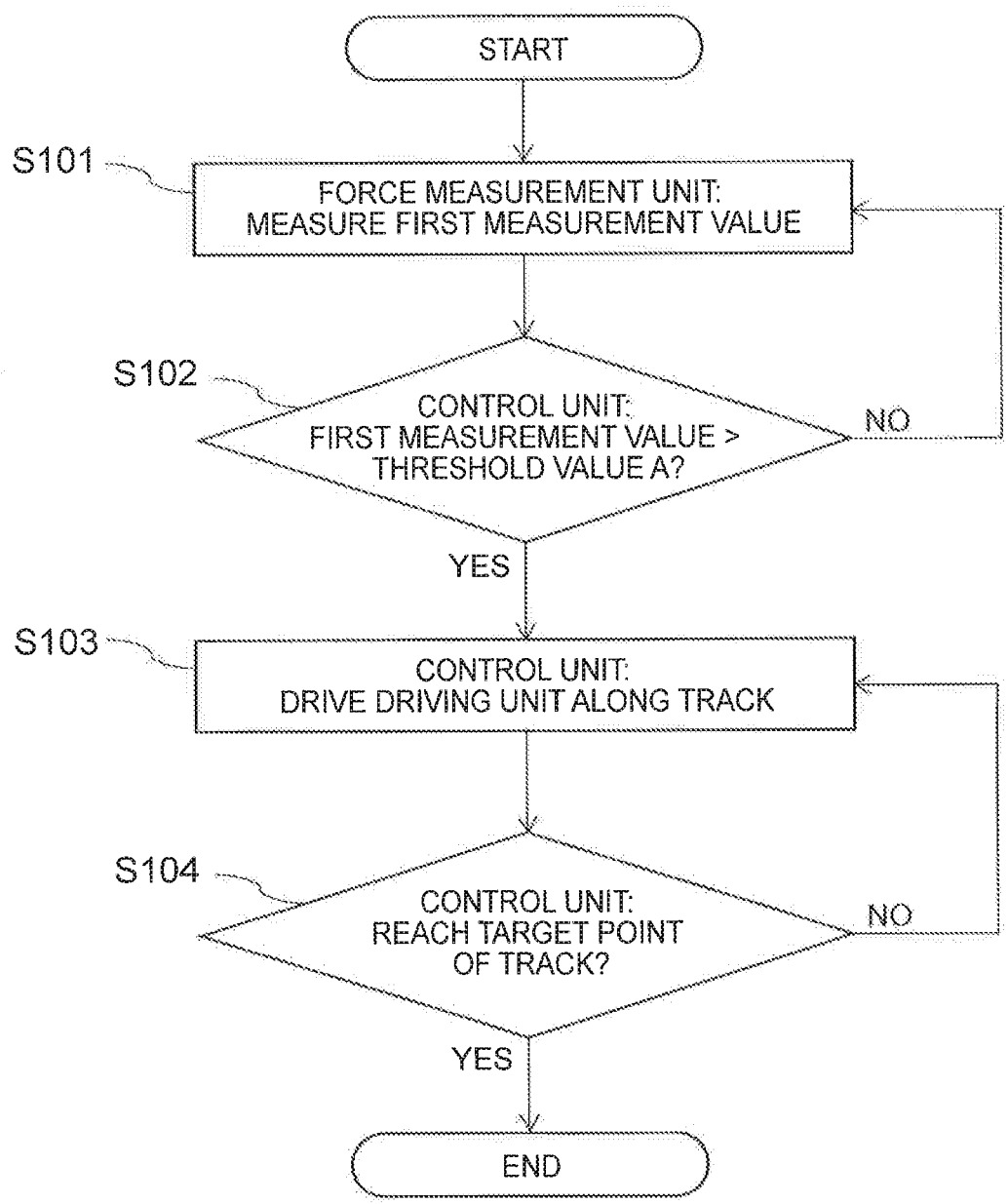
FIG. 4 is a flowchart illustrating operation of the driving apparatus according to the first embodiment.

FIG. 4 is a flowchart for explaining operation of the driving apparatus 100.

In S101, the force measurement unit 30 obtains the first measurement value by measuring the force applied to the support unit 10. For example, a point in time when the force measurement unit 30 performs measurement may be in a period from when the user uses the switch (not shown) to command the driving apparatus 100 to provide assistance to when the assistance is finished, or the measurement may continuously be performed at all times while the driving apparatus 100 is in the ON state.

In S102, the control unit 40 compares the first measurement value received from the force measurement unit 30 and the threshold value A. When the first measurement value is equal to or less than the threshold value A, S101 is performed again. When the first measurement value is more than the threshold value A, S103 is subsequently performed.

In S103, the control unit 40 performs control to drive the driving unit 20 along the track defined in advance.

In S104, the control unit 40 determines whether the driving unit 20 reaches the target point of the track, and when the driving unit 20 is determined not to have reached the target point of the track, S103 is performed again. When the driving unit 20 is determined to have reached the target point of the track, the driving (assistance) is finished.

Figure 5:
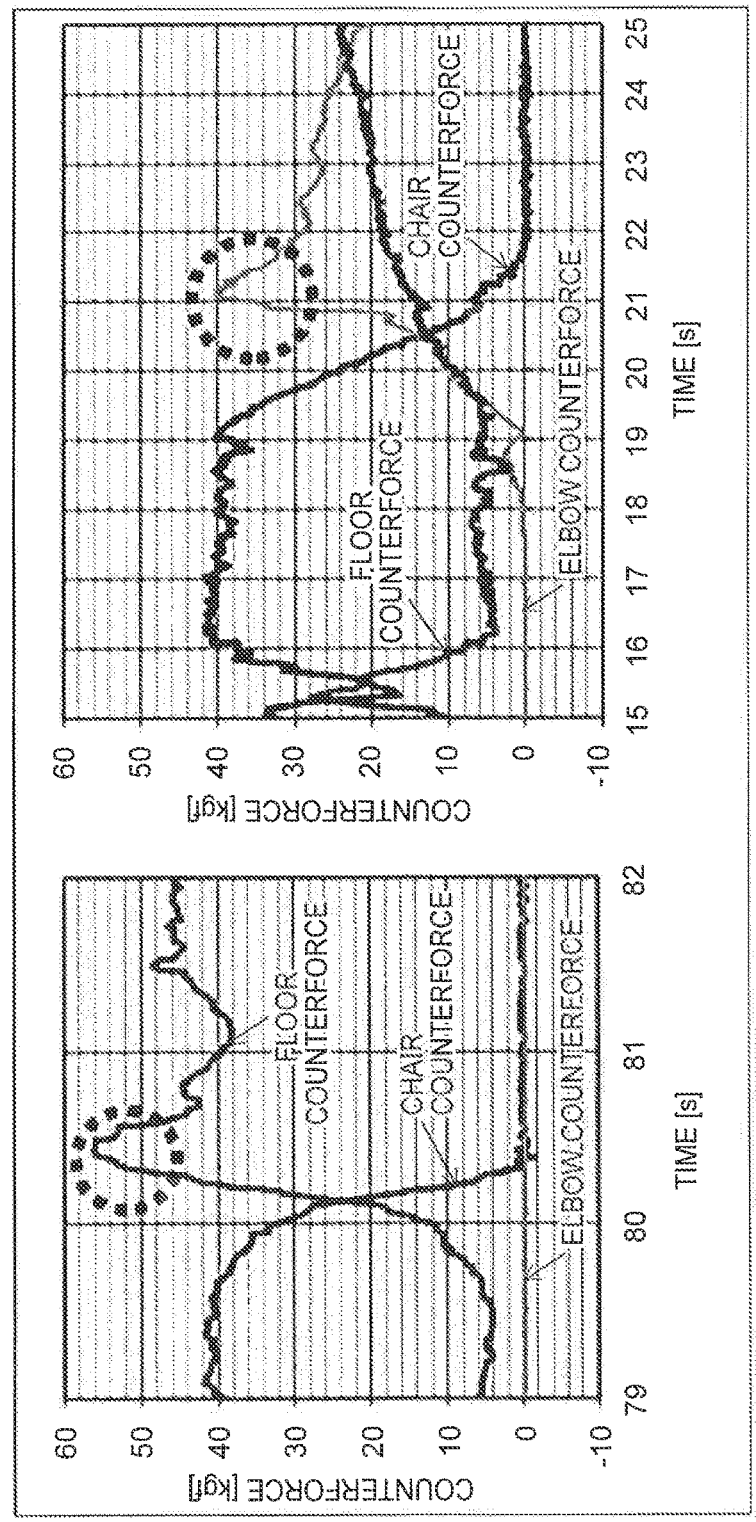
FIG. 5 is a figure illustrating a transition of a load over time during assistance provided by the driving apparatus according to the first embodiment.

FIG. 5 is a figure illustrating transitions of a floor counterforce, an elbow counterforce, and a chair counterforce (collectively referred to as a load) over time. FIG. 5 illustrates a transition of a load over time during an ordinary standing up action. FIG. 5 illustrates a transition of a load over time during assistance provided by the driving apparatus supporting the load applied in the adduction/abduction direction according to the present embodiment.

FIG. 5 illustrates a case where the instance at which the chair counterforce suddenly changes toward zero is an instance of rise. This indicates that, when the driving apparatus according to the present embodiment is used, the load is reduced as compared with a load applied to a lower limb in an ordinary standing up action, and the sudden burden intensively applied to the lower limb is eliminated. For this reason, this indicates that the driving apparatus 100 can reduce the load required for the standing up action.

This indicates that, according to the driving apparatus 100 of the present embodiment, the standing up action is assisted while the load applied in the adduction/abduction direction is supported, so that the change of the load applied in the bending/extending direction of the user's knees is reduced, whereby the person's standing up action can be assisted in a stable manner.

The driving apparatus 100 according to the present embodiment may be configured in such a manner that the driving unit 20 further includes a member 23 extending and shrinking of x axis direction, so that the support unit 10 is moved of x axis, y axis and z axis directions.

(Second Embodiment)

Figure 6:
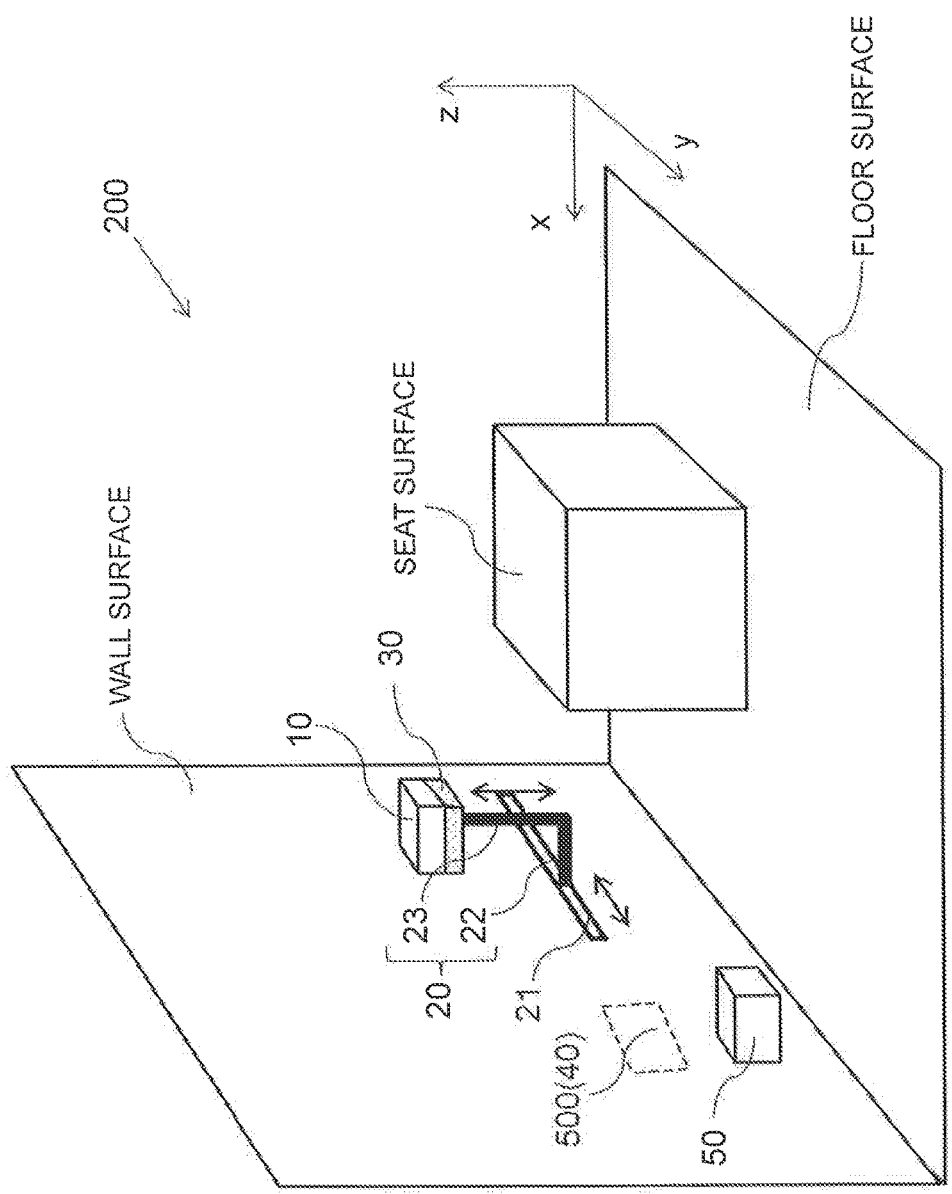
FIG. 6 is a figure schematically illustrating a driving apparatus according to a second embodiment.

FIG. 6 is a figure schematically illustrating a driving apparatus 200 according to the second embodiment. When the control unit 40 determines whether the posture of the user is sufficiently inclined with respect to the side surface or not, the driving apparatus 100 according to the first embodiment causes the control unit 40 to use only the measurement result of the force measurement unit 30, whereas the driving apparatus 200 according to the second embodiment causes the control unit 40 to use not only a measurement result provided by the force measurement unit 30 but also the position of the foot of the user.

The driving apparatus 200 as shown in FIG. 6 is different from the driving apparatus 100 according to the first embodiment mainly in that the driving apparatus 200 as shown in FIG. 6 includes a foot position measurement unit (second measurement unit) 50 for measuring the position of the foot of the user. In the explanation below, the same elements as those of the driving apparatus 100 according to the first embodiment are denoted with the same reference numerals, and description thereabout is omitted.

Figure 7:
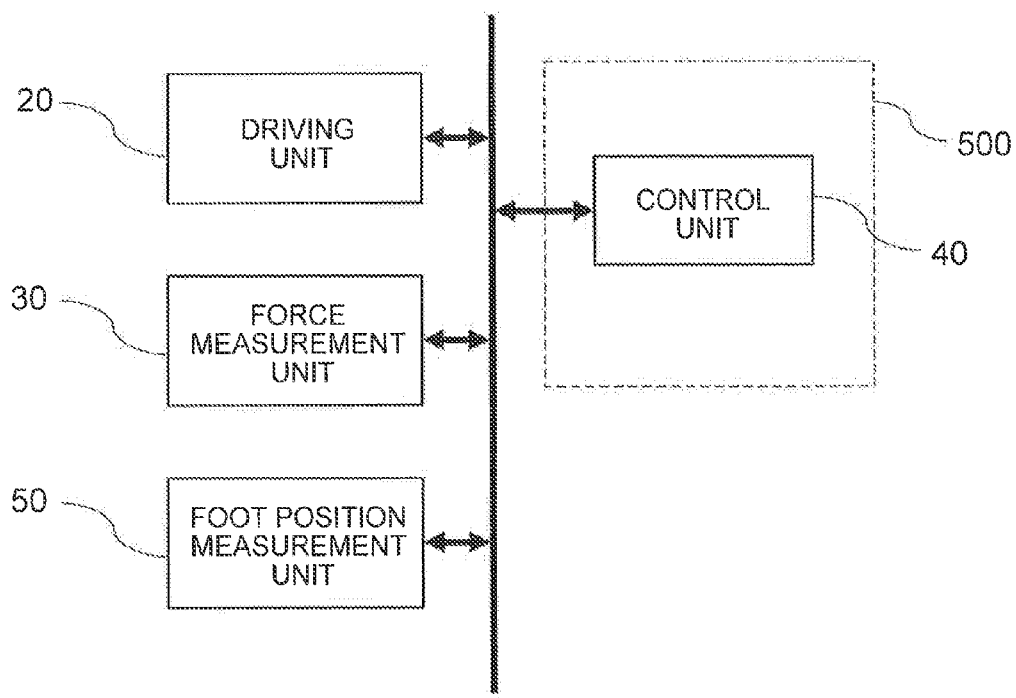
FIG. 7 is a block diagram of the driving apparatus according to the second embodiment.

FIG. 7 is a block diagram illustrating the driving apparatus 200 according to the second embodiment. In FIG. 7, each configuration as shown in FIG. 6 is connected with each other via a bus.

The foot position measurement unit 50 is a sensor for measuring the position of the foot of the user, and, for example, provided on the wall surface having the support unit 10 provided thereon with respect to the user. The foot position measurement unit 50 makes a serial connection with the control unit 40 via a serial communication cable (not shown). In this case, the position of the foot means, for example, a distance from the wall surface to the foot (at a side closer to the support unit 10) of x axis direction. The detection unit 50 may be a distance sensor for measuring a distance from the wall surface to any given point of the foot of the user by using infrared light and the like, and an image processing apparatus (including a camera) for measuring a distance from the wall surface to any given point of the foot of the user by detecting an image of the position of the foot of the user and performing image processing. The foot position measurement unit 50 measures the distance from the wall surface to any given point of the foot of the user, and transmits a measured result (second measurement value) via the serial communication cable to the control unit 40. The second measurement value is a coordinate indicating a distance from the wall surface to any given point of the foot, and is represented by at least a coordinate including the distance of x axis direction.

The control unit 40 determines that (condition 1) is satisfied when the measurement value received from the force measurement unit 30 is more than a certain threshold value B. The control unit 40 determines that (condition 2) is satisfied when the measurement value received from the foot position measurement unit 50 is included in a certain range A. In this case, the range A is given by, for example, the lower limit and the upper limit of the distance from the wall surface of x axis direction, and can be set in advance on the basis of the measurement result at this occasion by previously checking an average distance in a state where the posture of the user is sufficiently inclined with respect to the side surface. For example, the range A is preferably set as a range including a position away from the wall surface by a distance about half of the length of stride of the user. More preferably, the range A is preferably set as a range in which the ratio between the height of the support unit 10 of z axis direction and the distance from the wall surface to the foot of the user is about 7:6. The threshold value B and the range A may be stored in the memory in advance.

In a case where the measurement value received from the force measurement unit 30 is more than the certain threshold value B, and the measurement value received from the foot position measurement unit 50 is included in the certain range A, the control unit 40 performs control to drive the driving unit 20 to the upper side along the track in y-z plane having at least a component in vertical direction (z axis direction). In this case, whether the measurement value received from the foot position measurement unit 50 is included in the certain range A or not can be determined by determining whether the distance from the wall surface to any given point of the foot of x axis direction is included in a value equal to or more than the lower limit value of the range A and equal to or less than the upper limit value of the range A. When the distances to multiple points of the foot are measured as the second measurement value, a determination may be made as to whether the distances to at least some of the points thereof are included in the range A.

Figure 8:
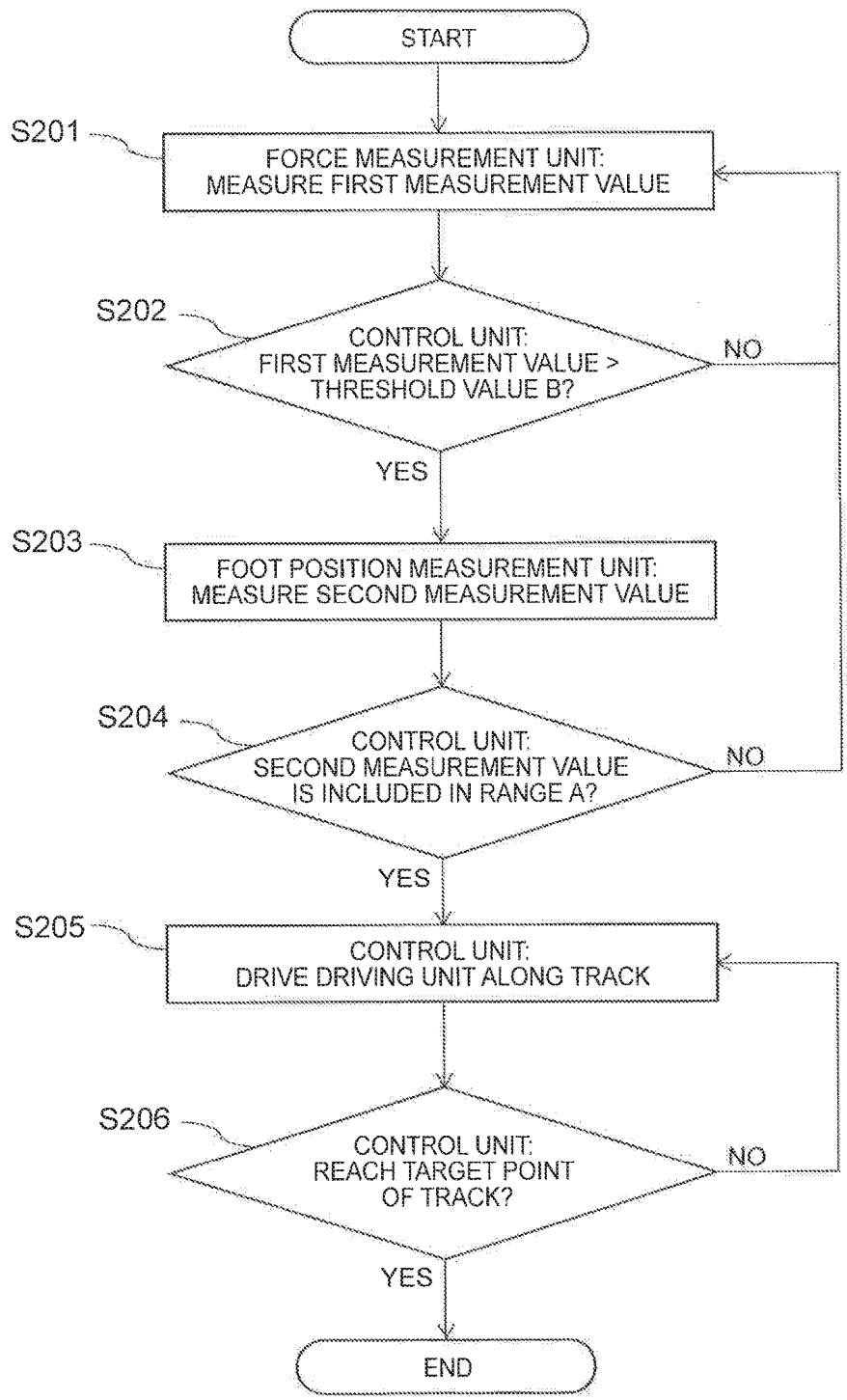
FIG. 8 is a flowchart illustrating operation of the driving apparatus according to the second embodiment.

FIG. 8 is a flowchart for explaining operation of the driving apparatus 200.

In S201, the force measurement unit 30 obtains the first measurement value by measuring the force applied to the support unit 10.

In S202, the control unit 40 compares the first measurement value received from the force measurement unit 30 and the threshold value B. When the first measurement value is determined to be equal to or less than the threshold value B, S201 is performed again. When the first measurement value is determined to be more than the threshold value B, S203 is subsequently performed.

In S203, the foot position measurement unit 50 obtains the second measurement value by measuring the foot position. For example, a point in time when the foot position measurement unit 50 performs measurement may be in a period from when the user uses the switch (not shown) to command the driving apparatus 200 to provide assistance to when the assistance is finished, or the measurement may continuously be performed at all times while the driving apparatus 200 is in the ON state. Alternatively, a point in time when the foot position measurement unit 50 performs measurement may be a time when the control unit 40 determines that the first measurement value is more than the threshold value B.

In S204, the control unit 40 compares the second measurement value received from the foot position measurement unit 50 with the range A. When the second measurement value is not included in the range A, S201 is performed again. When the second measurement value is included in the range A, S205 is subsequently performed. In this case, the control unit 40 may compare the lower limit value of the range A and the second measurement value, and determine whether the second measurement value is more than the lower limit value or not. When the second measurement value is determined not to be included in the range A, S203 may be performed again.

In S205, the control unit 40 performs control so as to drive the driving unit 20 along the track defined in advance.

In S206, the control unit 40 determines whether the driving unit 20 reaches the target point of the track, and when the driving unit 20 is determined not to have reached the target point of the track, S205 is performed again. When the driving unit 20 is determined to have reached the target point of the track, the driving (assistance) is finished.

According to the driving apparatus 200 of the present embodiment, the control unit 40 uses the measurement result of the force measurement unit 30 and the measurement result of the foot position measurement unit 50, so that the control unit 40 can reliably determine whether the posture of the user is sufficiently inclined with respect to the side surface or not. Therefore, a person's standing up action can be assisted in a reliable manner.

(Third Embodiment)

Figure 9:
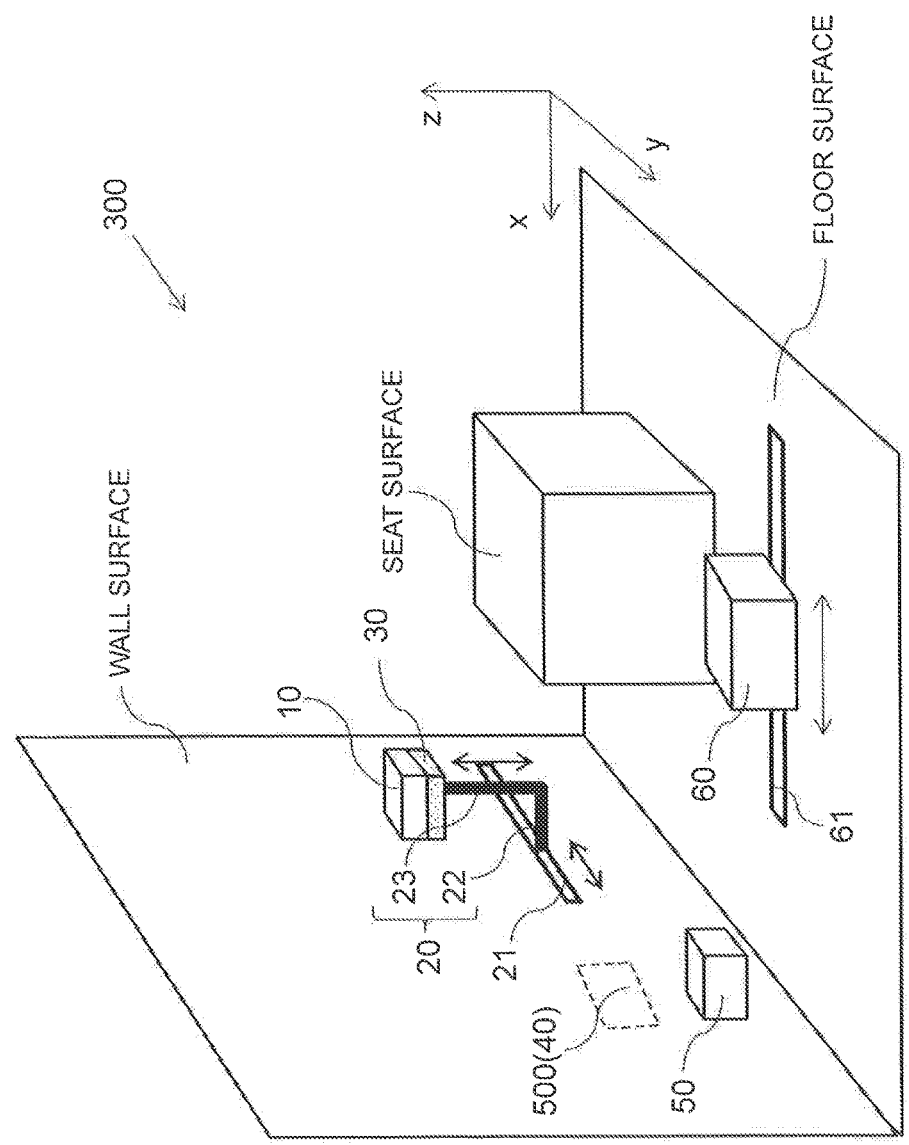
FIG. 9 is a figure schematically illustrating a driving apparatus according to a third embodiment.

FIG. 9 is a figure schematically illustrating a driving apparatus 300 according to the third embodiment. The driving apparatus 300 as shown in FIG. 9 is different from the driving apparatuses 100, 200 according to the first and second embodiments mainly in that the driving apparatus 300 as shown in FIG. 9 includes an adjustment unit 60 for adjusting the posture of the user (the position of the foot). In the explanation below, the same elements as those of the driving apparatuses 100, 200 according to the first and second embodiments are denoted with the same reference numerals, and description thereabout is omitted.

Figure 10:
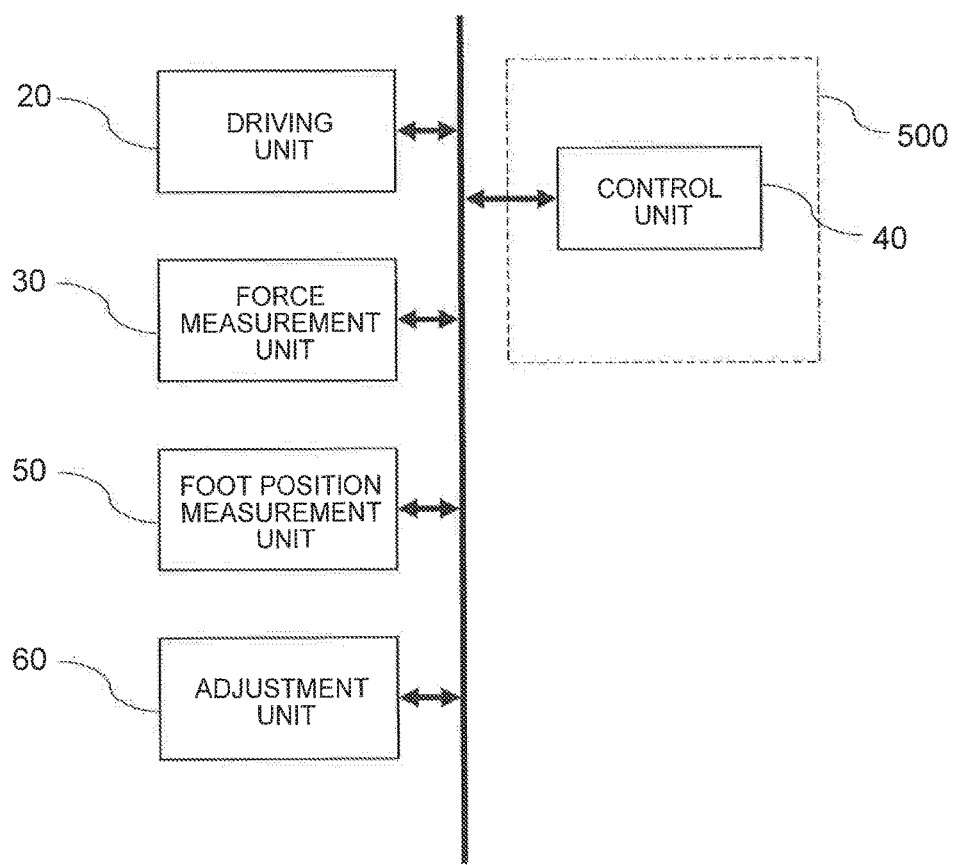
FIG. 10 is a block diagram illustrating the driving apparatus according to the third embodiment.

FIG. 10 is a block diagram of the driving apparatus 300 according to the third embodiment. In FIG. 10, each configuration as shown in FIG. 9 is connected with each other via a bus.

The adjustment unit 60 is a stage provided at a position where the user can place his or her feet while the user sits on the toilet seat, and is provided on the floor surface (x-y plane) so that, for example, the adjustment unit 60 can move in a direction away from the wall surface (support unit 10) along the rail 61 (the negative direction of x axis). The adjustment unit 60 is driven by a motion force source (not shown) such as a motor, so that when the adjustment unit 60 moves in the negative direction of x axis, the posture of the user is inclined with respect to the wall surface. The adjustment unit 60 makes a serial connection with the control unit 40 via a serial communication cable (not shown).

The control unit 40 drives the adjustment unit 60 so that the measurement value received from the foot position measurement unit 50 attains a value closer a target value. It should be noted that the target value can be set to a value included in the range A in advance. An example of method according to which the control unit 40 drives the adjustment unit 60 includes a technique of a known feedback control.

In a case where the measurement value received from the force measurement unit 30 is more than the certain threshold value B, and the measurement value received from the foot position measurement unit 50 is included in the certain range A, the control unit 40 performs control to drive the driving unit 20 to the upper side along the track in y-z plane having at least a component in vertical direction (z axis direction).

Figure 11A:
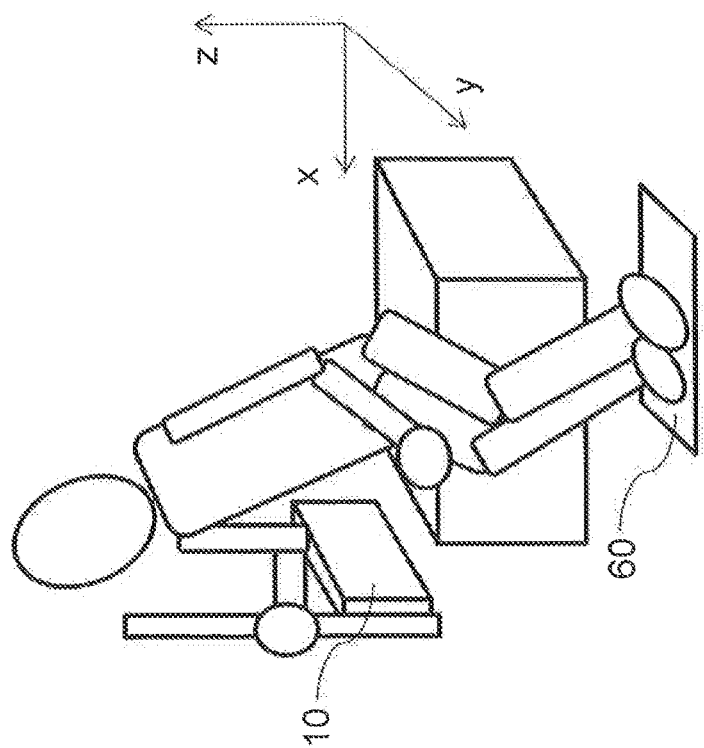
FIGS. 11(A) and 11(B) are figures illustrating an example of assistance provided by the driving apparatus according to the third embodiment.
Figure 11B:
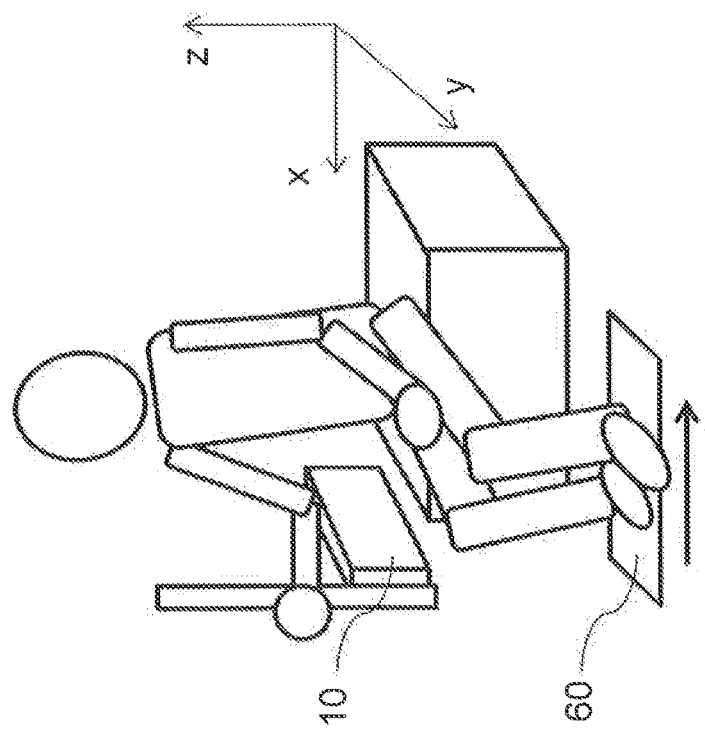

FIGS. 11(A) and 11(B) illustrate a flow when the driving apparatus 300 is used to provide assistance in the standing up action. FIG. 11(A) illustrates a state before driving the adjustment unit 60. FIG. 11(B) illustrates a state after driving the adjustment unit 60. As shown in FIGS. 11(A) and 11(B), when the driving unit 60 is driven in a direction away from the wall surface (the support unit 10) (the negative direction of x axis), the posture of the user is inclined with respect to the wall surface.

Figure 12:
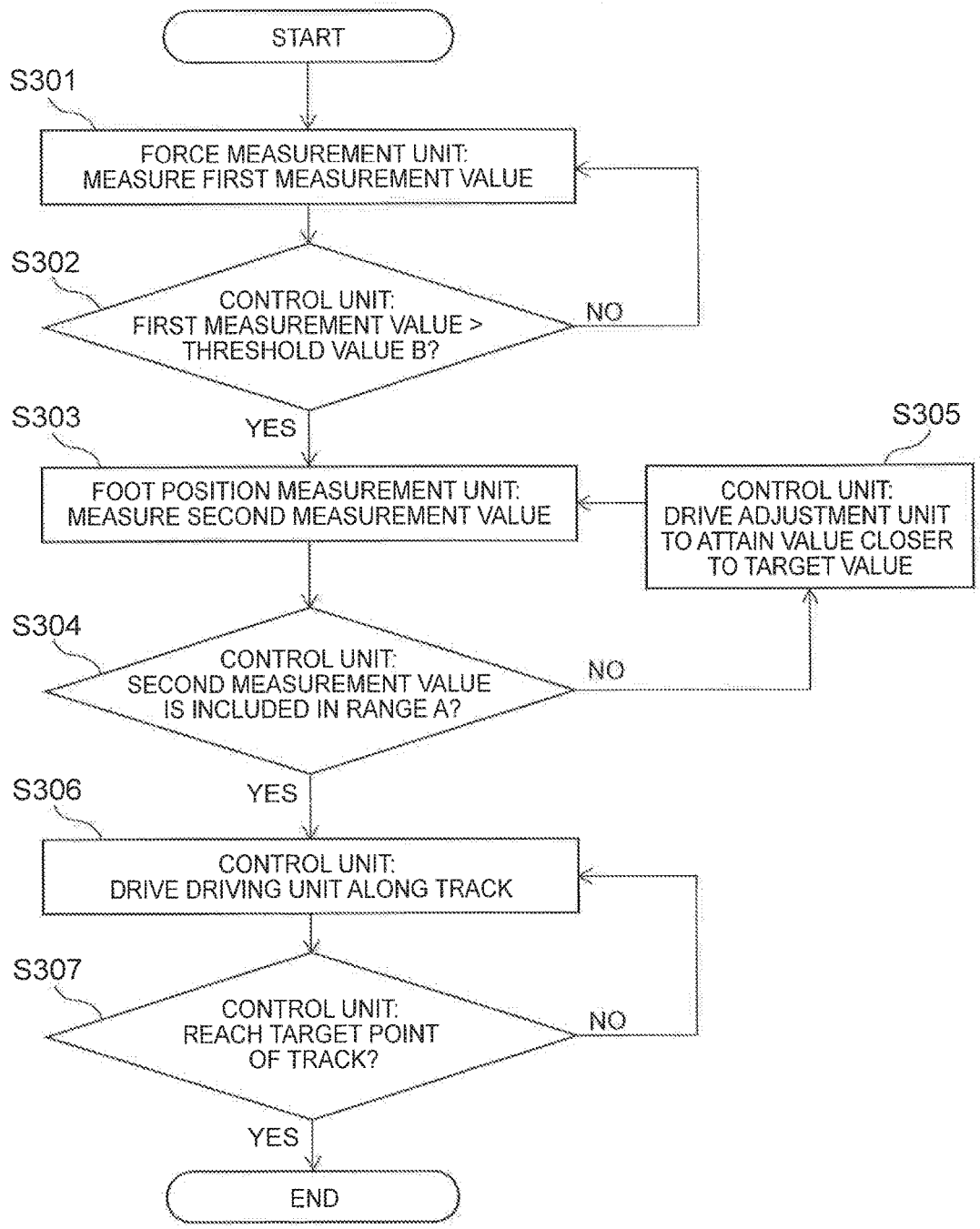
FIG. 12 is a flowchart illustrating operation of the driving apparatus according to the third embodiment.

FIG. 12 is a flowchart for explaining operation of the driving apparatus 300.

In S301, the force measurement unit 30 obtains the first measurement value by measuring the force applied to the support unit 10.

In S302, the control unit 40 compares the first measurement value received from the force measurement unit 30 and the threshold value B. When the first measurement value is determined to be equal to or less than the threshold value B, S301 is subsequently performed. When the first measurement value is determined to be more than the threshold value B, S303 is subsequently performed.

In S303, the foot position measurement unit 50 obtains the second measurement value by measuring the foot position.

In S304, the control unit 40 compares the second measurement value received from the position of the foot measurement unit 50 with the range A. When the second measurement value is determined not to be included in the range A, S305 is subsequently performed. When the second measurement value is determined to be included in the range A, S306 is subsequently performed.

In S305, the control unit 40 drives the adjustment unit 60 so that the second measurement value attains a value closer a target value of the position of the foot defined in advance, and the returns back to S304.

In S306, the control unit 40 performs control so as to drive the driving unit 20 along the track defined in advance.

In S307, the control unit 40 determines whether the driving unit 20 reaches the target point of the track, and when the driving unit 20 is determined not to have reached the target point of the track, S306 is performed again. When the driving unit 20 is determined to have reached the target point of the track, the driving (assistance) is finished.

According to the driving apparatus 300 of the present embodiment, the adjustment unit 60 can prompt the user to incline the posture of the user with respect to the side surface, and the standing up action can be assisted smoothly.

(Fourth Embodiment)

Figure 13:
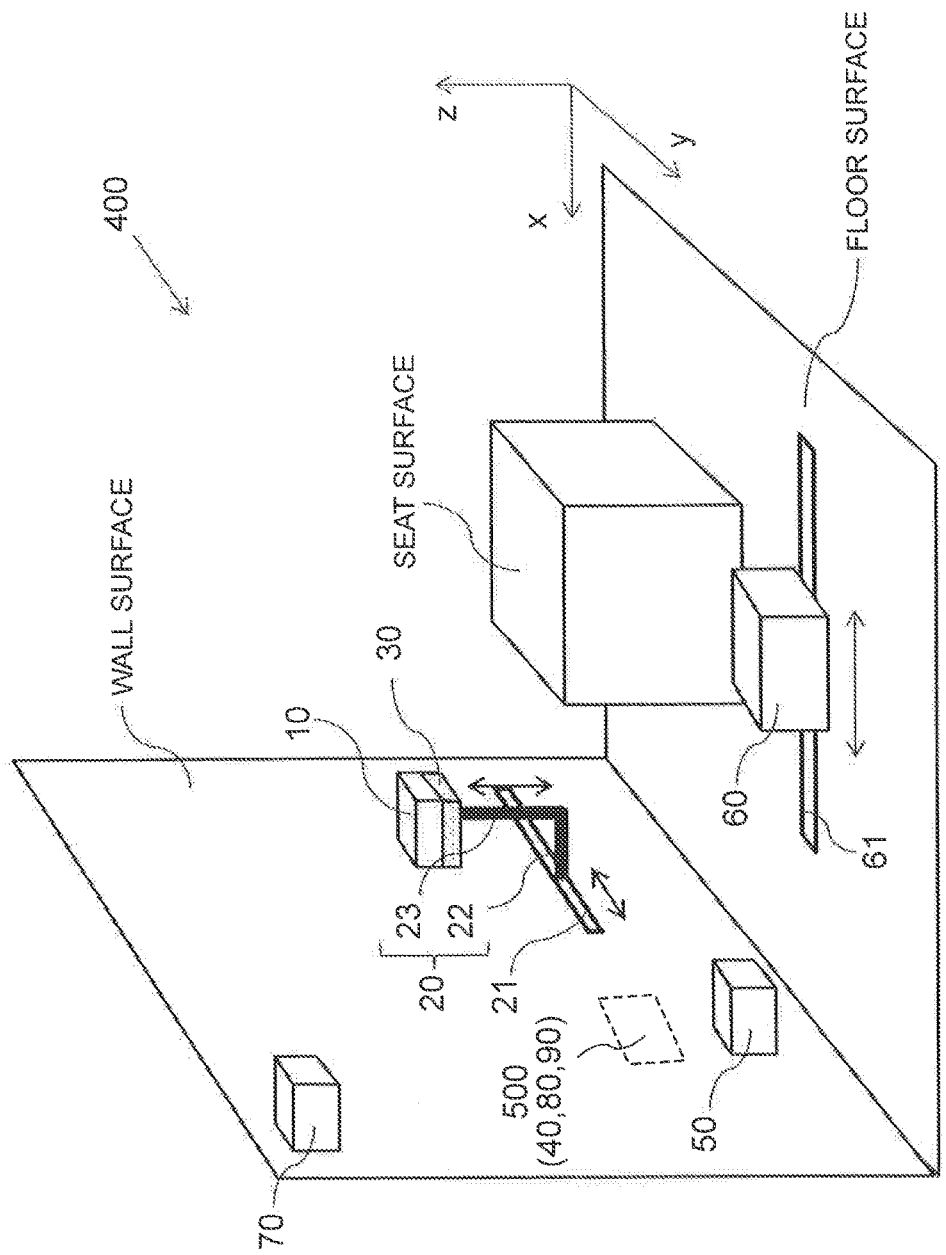
FIG. 13 is a figure schematically illustrating the driving apparatus according to the fourth embodiment.

FIG. 13 is a figure schematically illustrating a driving apparatus 400 according to the fourth embodiment. The driving apparatus 400 as shown in FIG. 13 is different from the driving apparatuses 100, 200, 300 according to the first, second, and third embodiments mainly in that the driving apparatus 400 as shown in FIG. 13 includes a detection unit 70 configured to detect an image of a user and a calculation unit 80 for calculating a feature quantity of the posture of the user on the basis of an image detected by the detection unit 70. In the explanation below, the same elements as those of the driving apparatuses 100, 200, 300 according to the first, second, and third embodiments are denoted with the same reference numerals, and description thereabout is omitted.

Figure 14:
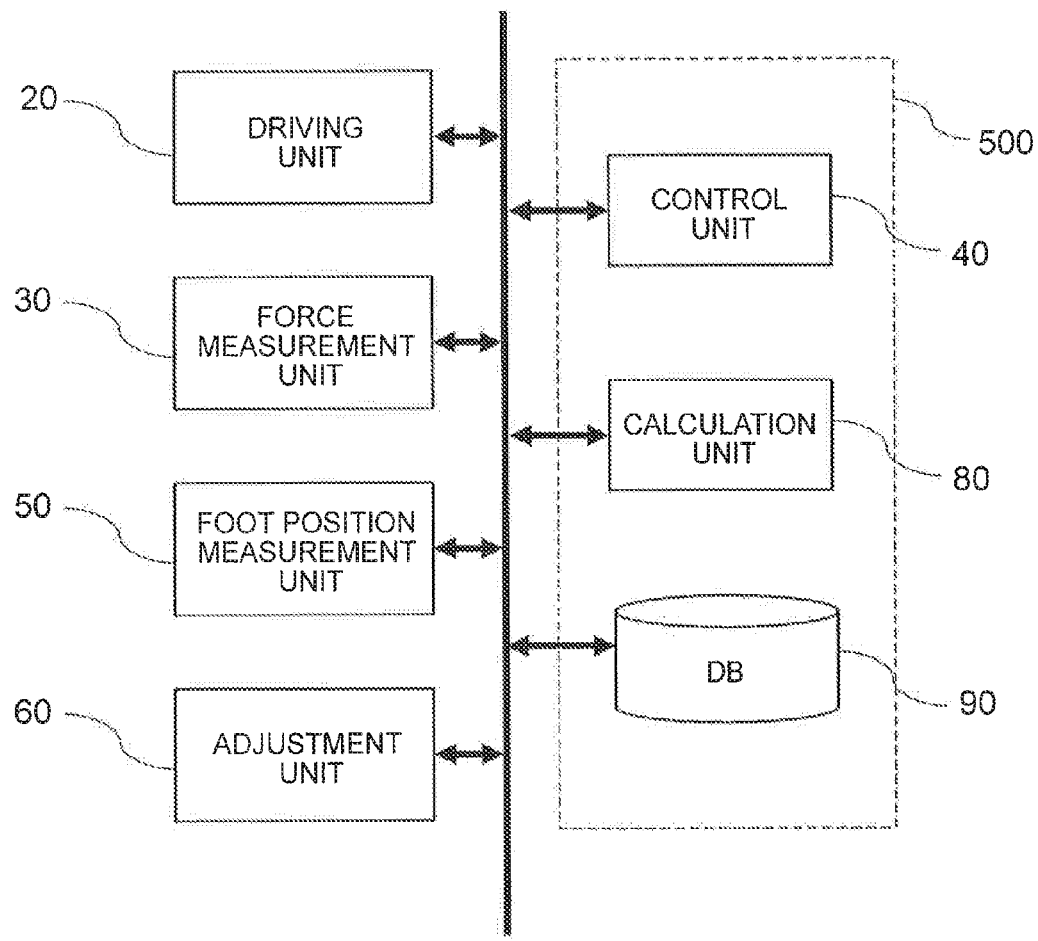
FIG. 14 is a block diagram illustrating a driving apparatus according to a fourth embodiment.

FIG. 14 is a block diagram of a driving apparatus 400 according to the fourth embodiment. In FIG. 14, each configuration as shown in FIG. 13 is connected with each other via a bus.

The detection unit 70 is a camera for detecting an image of the user, and more particularly, the detection unit 70 is provided at a position where the image of the feet of the user can be obtained (for example, close to the ceiling). The detection unit 70 makes a serial connection with the calculation unit 80 via, for example, a serial communication cable (not shown), and transmits a detection result via the serial communication cable to the calculation unit 80.

The calculation unit 80 calculates the feature quantity of the posture of the user (in particular, the feet) on the basis of the detection result received from the detection unit 70. In this case, the feature quantity of the posture means a quantity representing the posture of a person as a quantitative numerical value, and, for example, the angle of each joint, the position of each part, and the like. For example, the calculation unit 80 calculates, as the feature quantity of the posture of the user, the ratio between the angle in the bending/extending direction and the angle in the adduction/abduction direction. The calculation unit 80 may calculate the load applied to the feet as the feature quantity. For example, by collating the angle information about each joint of the feet and the lower limb model generated on the basis of the human anatomy data, the loads applied to the quadriceps and the hamstrings and the loads applied to the adducent muscles and the abducent muscles of the hip joints are calculated respectively. An example of method according to which the calculation unit 80 calculates the feature quantity includes a technique of a known image processing. The calculation unit 80 is like the control unit 40 or separately embedded in the wall as a unit 500 including an arithmetic processing unit and a memory.

The control unit 40 drives the adjustment unit 60 so that the feature quantity calculated by the calculation unit 80 attains a value closer a target value of the feature quantity stored in advance in the database (DB) 90 as the posture suitable for the standing up action. An example of method according to which the control unit 40 drives the adjustment unit 60 includes a technique of a known feedback control.

When the measurement value received from the force measurement unit 30 is more than the certain threshold value B, and the feature quantity calculated by the calculation unit 80 is included in the certain range B, the control unit 40 performs control to drive the driving unit 20 to the upper side along the track in y-z plane having at least a component in vertical direction (z axis direction). In this case, the range B can be set in advance as a range that may be deemed as sufficiently being close to the posture stored in the DB 90 in advance.

Figure 15:
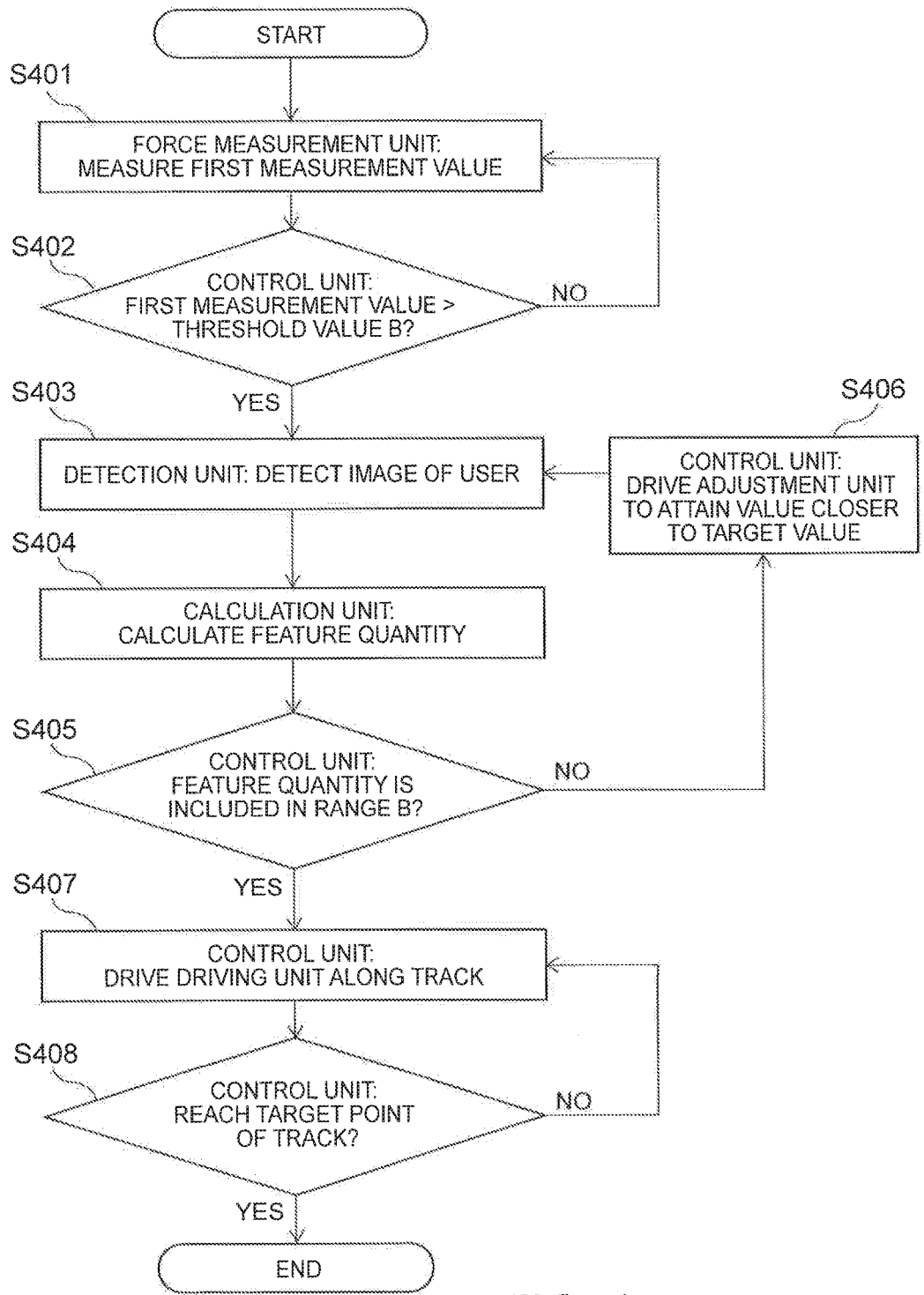
FIG. 15 is a flowchart illustrating operation of the driving apparatus according to the fourth embodiment.

FIG. 15 is a flowchart for explaining operation of the driving apparatus 400.

In S401, the force measurement unit 30 obtains the first measurement value by measuring the force applied to the support unit 10.

In S402, the control unit 40 compares the first measurement value received from the force measurement unit 30 and the threshold Value B. When the first measurement value is determined to be equal to or less than the threshold value B, S401 is subsequently performed. When the first measurement value is determined to be more than the threshold value B, S403 is subsequently performed.

In S403, the detection unit 70 detects an image of the user. For example, a point in time when the detection unit 70 performs detection may be in a period from when the user uses the switch (not shown) to command the driving apparatus 400 to provide assistance to when the assistance is finished, or the measurement may continuously be performed at all times while the driving apparatus 400 is in the ON state. Alternatively, a point in time when the detection unit 70 performs detection may be a time when the control unit 40 determines that the first measurement value is more than the threshold value B.

In S404, the calculation unit 80 calculates the feature quantity of the posture of the user on the basis of the detection result received from the detection unit 70.

In S405, the control unit 40 compares the feature quantity calculated by the calculation unit 80 and the range B. When the feature quantity is not included in the range B, S406 is subsequently performed. When the feature quantity is determined to be included in the range B, S407 is subsequently performed.

In S406, the control unit 40 drives the adjustment unit 60 so that the feature quantity attains a target value of the feature quantity defined in advance, and S403 is subsequently performed.

In S407, the control unit 40 performs control so as to drive the driving unit 20 along the track defined in advance.

In S408, the control unit 40 determines whether the driving unit 20 reaches the target point of the track, and when the driving unit 20 is determined not to have reached the target point of the track, S407 is performed again. When the driving unit 20 is determined to have reached the target point of the track, the driving (assistance) is finished.

According to the driving apparatus 400 of the present embodiment, the user can be prompted to cause the posture of the user to a posture suitable for standing up action, and while the load applied to the feet of the user is reduced, the standing up action can be assisted.

The driving apparatus 400 of the present embodiment can store, to the DB 90, the maximum value of the angle in the bending/extending direction and the maximum value of the angle in the adduction/abduction direction on the basis of the human anatomy data. At this occasion, when the state of the feet detected by the detection unit 70 is determined to be more than the maximum value of each of them, the control unit 40 may determine that the user is likely to fall, and may stop the driving of the driving unit 20.

According to the driving apparatus 400 of the present embodiment, the control unit 40 can make determination on the basis of the feature quantity calculated by the calculation unit 80 (condition 2), and therefore, the foot position measurement unit 50 may not be necessarily provided.

(Modification)

Figure 16A:
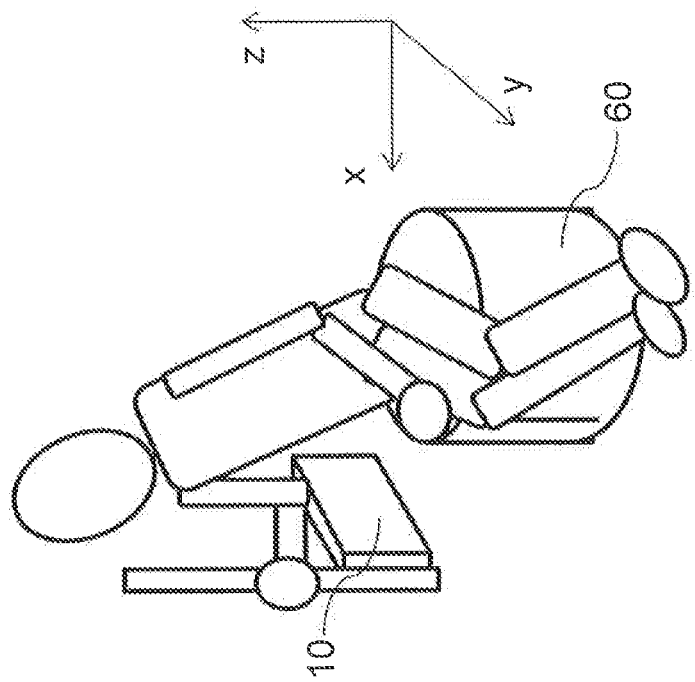
FIGS. 16(A) and 16(B) are figures illustrating an adjustment unit according to a modification.
Figure 16B:
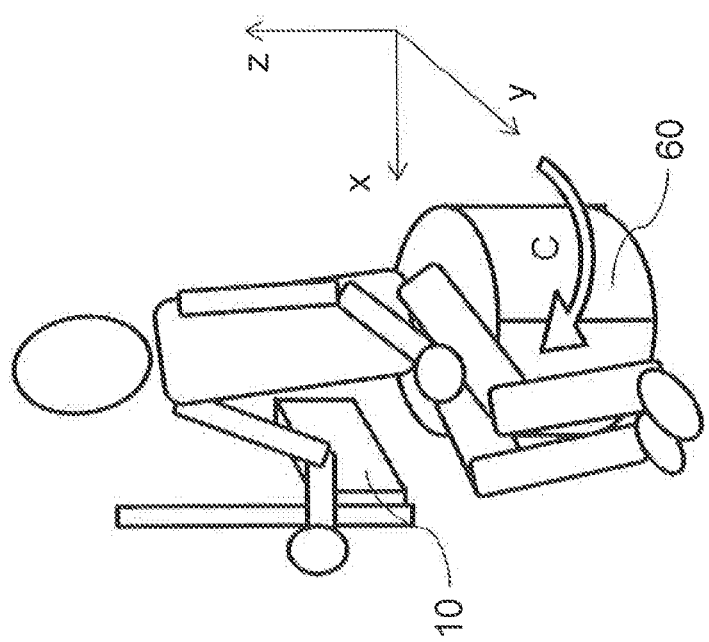

The adjustment unit 60 as shown in FIGS. 16(A) and 16(B) is a chair rotating about the rotation center of z axis. FIG. 16(A) illustrates a state before driving the adjustment unit 60. FIG. 16(B) illustrates a state after driving the adjustment unit 60. The control unit 40 rotates and drives the adjustment unit 60 about z axis in arrow C direction, so that the posture of the user is inclined with respect to the wall surface.

According to the driving apparatus or the driving method according to at least an embodiment explained above, a person's standing up action can be assisted stably.

These embodiments are presented as examples, and are not intended to limit the scope of the invention. These embodiments can be carried out in various other forms, and various kinds of omissions, replacements, and changes can be applied without deviating from the gist of the invention. The embodiments and the modifications thereof are included in the scope and the gist of the invention, and likewise, included in the invention described in claims and the equivalent range thereof.

What is claimed is:

1. A driving apparatus comprising:
   a wall-mounted support structure configured to support a portion of an upper limb of a user, the support structure comprising;
      a support unit having a top surface configured to support the portion of the upper limb of the user; and
      a driving unit comprising a track mounted to a wall surface and one or more members coupled to the support unit and configured to move the support unit along the track having at least a component in a direction perpendicular to a floor surface;
a first measurement unit configured to obtain a first measurement value by measuring a force applied to the support unit; and
a control unit configured to drive the driving unit when the first measurement value is more than a predetermined threshold value.

2. The driving apparatus according to claim 1, comprising:
an adjustment unit capable of moving the foot position of the user in a direction away from the support unit,
a detection unit configured to obtain a detection result by detecting the posture of the user;
a calculation unit configured to calculate a feature quantity of the posture of the user on the basis of the detection result; and
a database configured to store a target value of the feature quantity,
wherein the control unit drives the adjustment unit so that the feature quantity becomes closer to the target value.

3. A driving apparatus comprising:
a support unit configured to support a portion of an upper limb of a user;
a driving unit configured to move the support unit along a track having at least a component in a direction perpendicular to a floor surface;
a first measurement unit configured to obtain a first measurement value by measuring a force applied to the support unit;
a control unit configured to drive the driving unit when the first measurement value is more than a predetermined threshold value; and
a second measurement unit configured to obtain a second measurement value by measuring a foot position of the user,
wherein when the first measurement value is more than the threshold value, and the second measurement value is included in a predetermined range, the control unit drives the driving unit.

4. The driving apparatus according to claim 3 further comprising:
an adjustment unit capable of moving the foot position of the user in a direction away from the support unit,
wherein when the second measurement value is not included in the range, the control unit drives the adjustment unit so that the second measurement value is included in the range.

5. The driving apparatus according to claim 3, comprising:
an adjustment unit capable of moving the foot position of the user in a direction away from the support unit,
a detection unit configured to obtain a detection result by detecting the posture of the user;
a calculation unit configured to calculate a feature quantity of the posture of the user on the basis of the detection result; and
a database configured to store a target value of the feature quantity,
wherein the control unit drives the adjustment unit so that the feature quantity becomes closer to the target value.

6. A driving method for a driving apparatus, comprising:
receiving a first measurement value obtained by measuring a force applied to a surface of a support unit configured to support a portion of an upper limb of a user;
determining that the first measurement value is more than a threshold value;
generating a control signal to move the support unit along a track mounted to a wall surface having at least a component in a direction perpendicular to a floor surface.

* * * * *